United States Patent
Davis et al.

(10) Patent No.: US 12,463,409 B2
(45) Date of Patent: Nov. 4, 2025

(54) SPLIT RING WIRE BUNDLE SEAL SLEEVE AND ASSEMBLY PROCESS

(71) Applicant: The Boeing Company, Arlington, VA (US)

(72) Inventors: Robert A. Davis, Redmond, WA (US); Lawrence Britten Adamski, Marysville, WA (US); Jeffrey Robert Dempsey, Mount Pleasant, SC (US); Christopher Day, Shelton, WA (US); Travis Edward Dreyfoos, Tukwila, WA (US)

(73) Assignee: The Boeing Company, Arlington, VA (US)

( * ) Notice: Subject to any disclaimer, the term of this patent is extended or adjusted under 35 U.S.C. 154(b) by 218 days.

(21) Appl. No.: 18/339,028

(22) Filed: Jun. 21, 2023

(65) Prior Publication Data
US 2024/0429694 A1    Dec. 26, 2024

(51) Int. Cl.
*H02G 3/22* (2006.01)
*B60R 16/02* (2006.01)
*F16L 5/10* (2006.01)

(52) U.S. Cl.
CPC .......... *H02G 3/22* (2013.01); *B60R 16/0222* (2013.01); *F16L 5/10* (2013.01)

(58) Field of Classification Search
CPC .. H02G 3/22; H02G 3/24; H02G 3/26; H02G 3/263; H02G 3/28; H02G 3/286; H02G 3/30; H02G 3/32; H02G 3/36; B60R 16/0222; B60R 16/0207; F16L 5/10

USPC .... 174/650, 656, 665, 152 G, 153 G, 152 R, 174/664, 135, 68.1, 72 A, 137 R; 248/68.1, 49; 16/2.1, 2.2

See application file for complete search history.

(56) References Cited

U.S. PATENT DOCUMENTS

| | | | | |
|---|---|---|---|---|
| 4,919,372 A * | 4/1990 | Twist | ........... | H02G 3/22 |
| | | | | 248/68.1 |
| 5,545,854 A * | 8/1996 | Ishida | ........... | H02G 3/081 |
| | | | | 16/2.2 |
| 5,639,993 A * | 6/1997 | Ideno | ........... | B60R 16/0222 |
| | | | | 174/153 G |
| 6,010,134 A * | 1/2000 | Katoh | ........... | B60R 16/0222 |
| | | | | 174/152 G |
| 6,180,882 B1 * | 1/2001 | Dinh | ........... | H02G 3/22 |
| | | | | 16/2.2 |
| 6,218,625 B1 | 4/2001 | Pulaski | | |
| 6,717,055 B2 * | 4/2004 | Kato | ........... | H02G 3/32 |
| | | | | 173/136 |
| 7,005,579 B2 * | 2/2006 | Beele | ........... | H02G 3/22 |
| | | | | 174/152 G |

(Continued)

FOREIGN PATENT DOCUMENTS

| FR | 2991114 A1 | 11/2013 |
|---|---|---|
| JP | 08335419 | 12/1996 |
| JP | 2021166417 A | 10/2021 |

OTHER PUBLICATIONS

European Patent Office, Extended European Search Report, dated Nov. 26, 2024, regarding EP Application No. 24179497.3, 8 pages.

*Primary Examiner* — Angel R Estrada
(74) *Attorney, Agent, or Firm* — Yee & Associates, P.C.

(57) ABSTRACT

The present disclosure includes a split ring wire bundle seal sleeve and an assembly technology for pressurized electrical feedthroughs. A kit of parts is also described.

20 Claims, 11 Drawing Sheets

(56) References Cited

U.S. PATENT DOCUMENTS

| | | | | |
|---|---|---|---|---|
| 7,534,965 B1* | 5/2009 | Thompson | ............... | H02G 3/22 |
| | | | | 174/152 G |
| 8,502,090 B2* | 8/2013 | Winship | ................... | H02G 3/22 |
| | | | | 174/72 A |
| 9,365,170 B2* | 6/2016 | Gronowicz, Jr. | ... | B60R 16/0222 |
| 9,944,239 B1* | 4/2018 | Diep | ....................... | H02G 3/081 |
| 10,113,669 B2* | 10/2018 | Logan | ........................ | F16L 5/08 |
| 10,544,884 B2* | 1/2020 | Beele | ........................ | F16L 5/10 |
| 11,056,867 B2* | 7/2021 | Obrist | .................... | H02G 3/123 |
| 11,848,547 B1* | 12/2023 | Burant | ................. | H02G 3/0481 |

* cited by examiner

SPLIT RING WIRE BUNDLE SEAL SLEEVE AND ASSEMBLY PROCESS

BACKGROUND INFORMATION

1. Field

The present disclosure relates generally to wiring, such as wiring within the interior of transportation equipment. More particularly, the present disclosure relates to bulkhead feed-through wiring in vehicles. Still more particularly, the present disclosure relates to methods and apparatus for air pressure tight sealing a split sleeve around wiring passing through a cabin pressure bulkhead. The description provides a disclosure of sealing process allowing for repair or replacement of feedthroughs without removal or disassembly of cabin monuments within a vehicle.

2. Background

Prior approaches to electrical feedthroughs in aircraft have too much human induced variability to result in a consistently acceptable product. Typically hand fitted together within an airframe, the feedthroughs can be complex machines.

Prior approaches to feedthroughs also take an excessive amount of time. Trial and error results in the same operation being performed multiple times, and each operation requires a significant amount of time.

Prior approaches can also create major problems for final assembly. Discovery of out of tolerance wire bundle diameters can occur as late as when both the plane and the wires are ready to be installed together on the plane.

Another issue with feedthroughs is that they are costly to remove or move, such as during owner renovation or reconfiguration. There is a need for a more feedthrough flexible technology.

Therefore, it would be desirable to have methods and apparatus that take into account a solution to at least some of the issues discussed above, as well as other possible issues. For example, it would be desirable to have methods and apparatus that overcome technical problems with sealing wire bundles passing through electrical feedthroughs in aircraft.

SUMMARY

The split ring wire bundle seal sleeve can operate as an internal component to compression seal fittings that pass electrical wiring through a pressure bulkhead. In embodiments, the two-piece, snap-together sleeve is assembled around wiring that has been treated with a sealant putty. The action of squeezing the sleeve halves together compresses the putty and creates a pressure resistant seal between the wires. The sleeve's latching mechanism maintains compression of the sealant while the sleeves internal ridges retain the putty and prevent air pressure from forcing it out of the sleeve. The wire sleeve can be manufactured in multiple configurations that are compatible with various wire bundle diameters and seal fitting design. Sealant retaining features, latch design, sleeve retaining features, length and diameter can be adapted to the application. The split wire sleeve is manufactured from a durable, non hygroscopic, glass fiber reinforced plastic.

An embodiment of the present disclosure provides a method of assembling a split wire sleeve for a pressure bulkhead wire feedthrough seal fitting, comprising: placing a charge of sealant putty around a set of wires; pre-assembling a split wire sleeve around the charge of sealant putty and wires, wherein the split wire sleeve comprises: an inner surface comprising a plurality of sealant putty gripping ridges; an outer surface comprising a sleeve retaining ridge; a first edge comprising a first snap-fit latch mechanism; and a second edge comprising a second snap-fit latch mechanism configured to snap-fit engage the first snap-fit latch mechanism; and assembling the split wire sleeve comprising squeezing the first edge toward the second edge, compressing the charge of sealant putty until the first snap-fit latch mechanism and the second snap-fit latch mechanism engage together, and creating a pressure resistant seal between the set of wires.

In another embodiment of the present disclosure, a split wire sleeve for a pressure bulkhead wire feedthrough seal fitting comprises: a split sleeve having a first end and a second end, the split sleeve comprising: an inner surface comprising a plurality of sealant putty gripping ridges; an outer surface comprising a sleeve retaining ridge that begins at the first end, that increases in height moving away from the first end, and that extends around all of a circular perimeter of the first end; a first edge comprising a first snap-fit latch mechanism that extends along at least part of the first edge; and a second edge comprising a second snap-fit latch mechanism that extends along at least part of the second edge and is configured to snap-fit engage the first snap-fit latch mechanism. In some embodiments, the first snap-fit latch mechanism extends along all of the first edge, the second snap-fit latch mechanism extends along all of the second edge, and the first snap-fit latch mechanism and the second snap-fit latch mechanism together cooperatively form a keyed interface to maintain consistent, longitudinal, and circumferential coupling when snap-fit engaged.

In another embodiment of the present disclosure, a kit of parts for assembling a pressure bulkhead wire feedthrough seal fitting, comprises: a split sleeve comprising a non-hygroscopic, glass fiber reinforced plastic, the split sleeve comprising: an inner surface comprising a plurality of sealant putty gripping ridges; an outer surface comprising a sleeve retaining ridge; a first edge comprising a first snap-fit latch mechanism; and a second edge comprising a second snap-fit latch mechanism configured to snap-fit engage the first snap-fit latch mechanism; a source of sealant putty; and a compression seal grommet.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations as described below. For example, FIGS. 1A-1F and FIGS. 2A-2E illustrate a split ring wire sleeve and a sealing process depicted in accordance with an illustrative embodiment. 1) The split ring's diameter is controlled by the tolerances on the molds used to make it. It has no human induced variability. Optionally, the split rings can be placed in a hand-held press that is used to squeeze out the partially cured sealant tape during snap ring installation. This ensures enough partially cured sealant tape is present to make a wire bundle seal.

Sealant tape is a type, form, species or manifestation of sealant putty. Tape is typically formed on a web; putty is normally shipped and sold in a pot. It is the sealant properties of the materials that will lead one to the next working embodiment; not form.

The split ring process takes 52 minutes less time than the existing one to install the partially cured sealant tape. Furthermore, it eliminates the repetitive guess and check process inherent in the existing design; and eliminates the strap wrench and electrical tape winding steps entirely. It also eliminates the need to measure and mark the seal zone; as the snap ring is the seal zone.

Figure 1A:
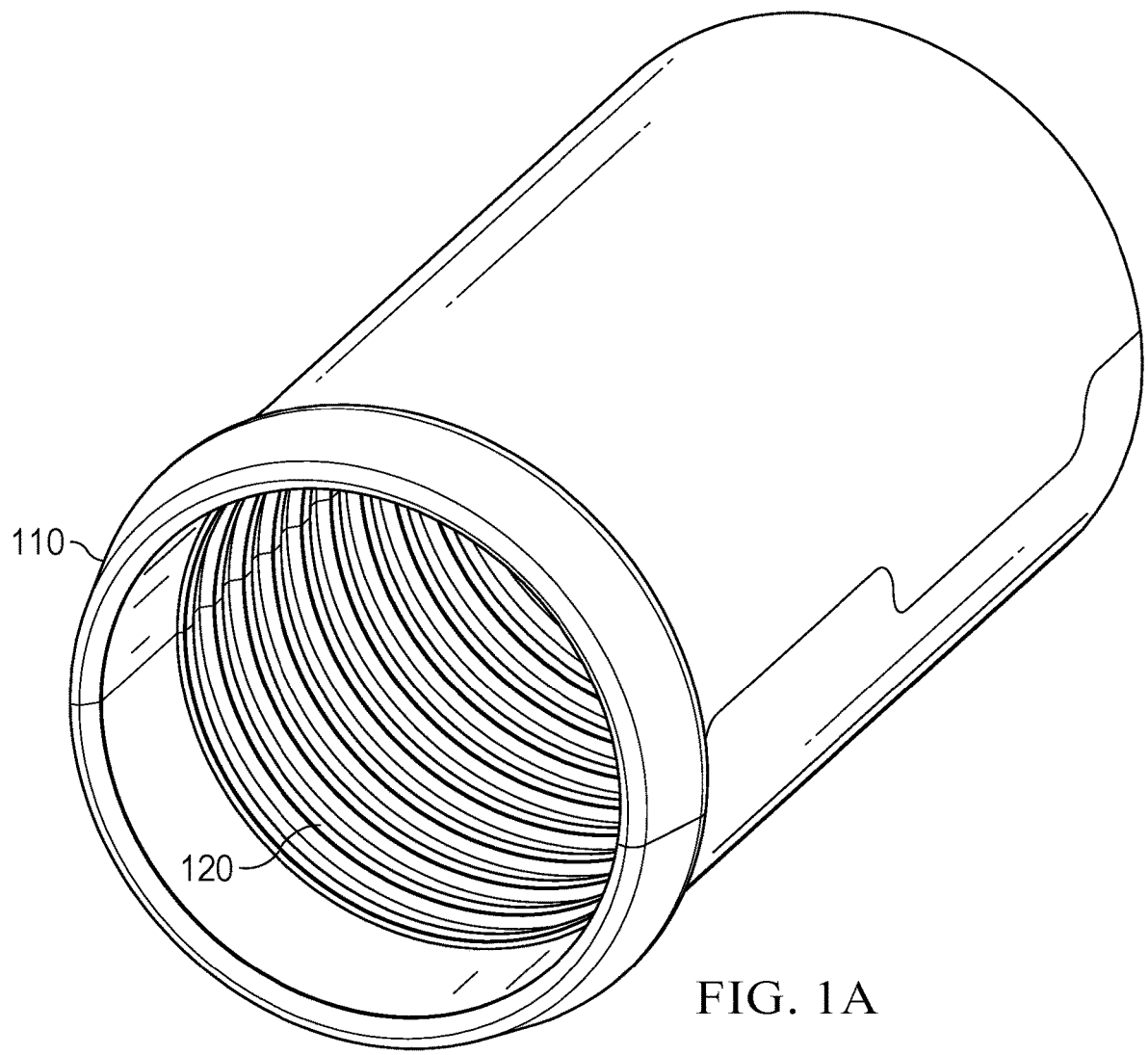
FIGS. 1A-1F are illustrations a split wire sleeve in accordance with an illustrative embodiment.
Figure 1B:
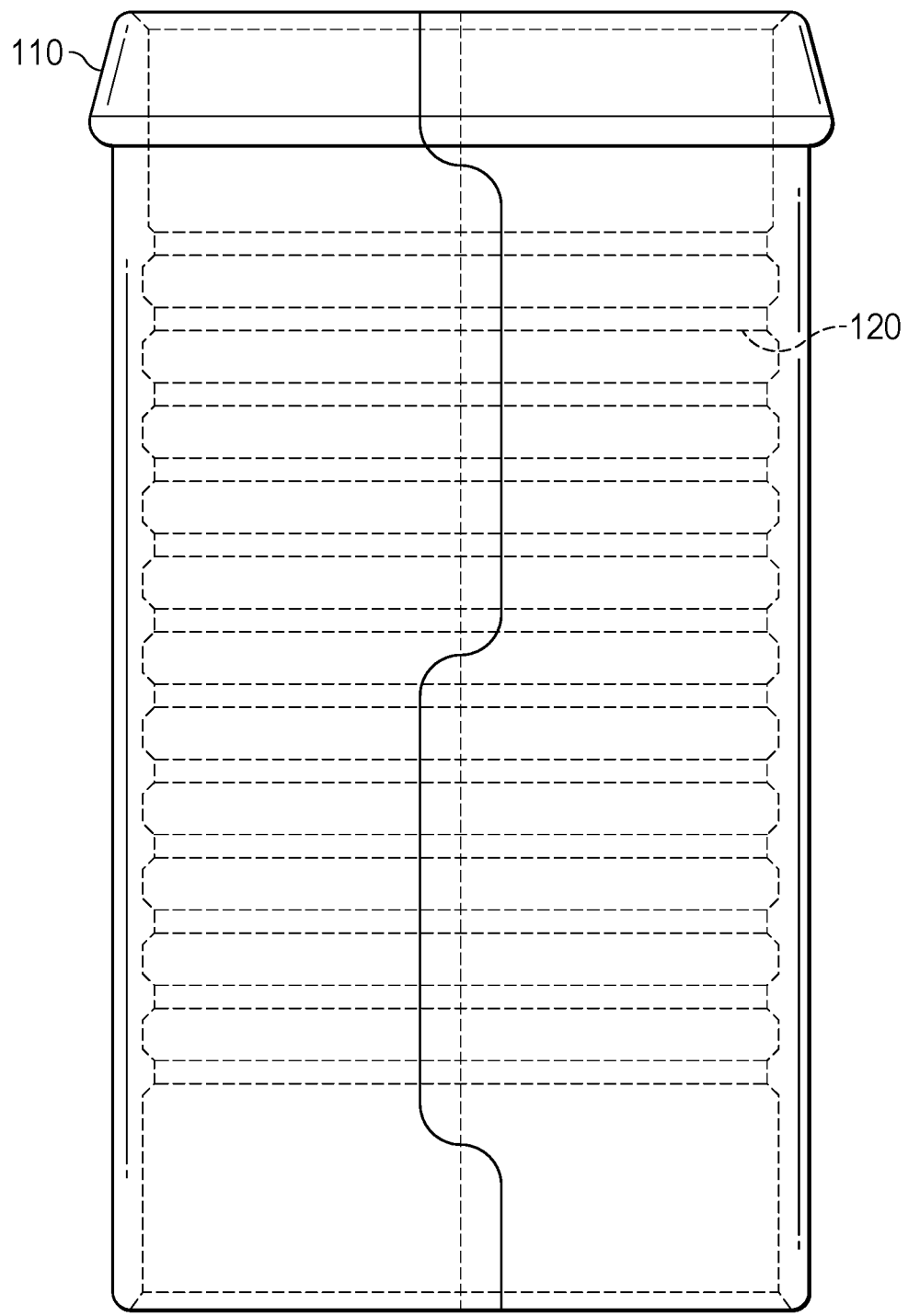
Figure 1C:
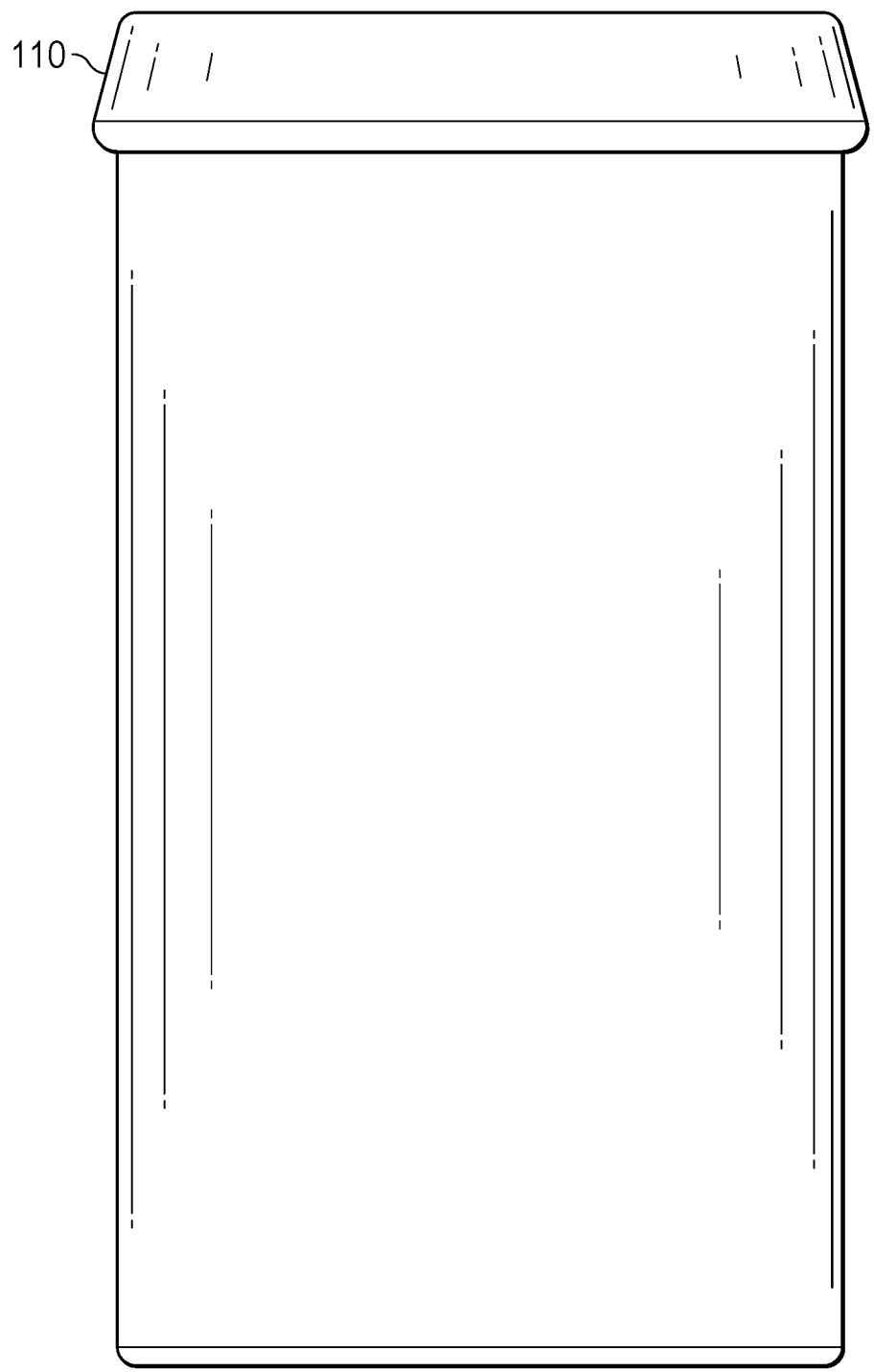
Figure 1D:
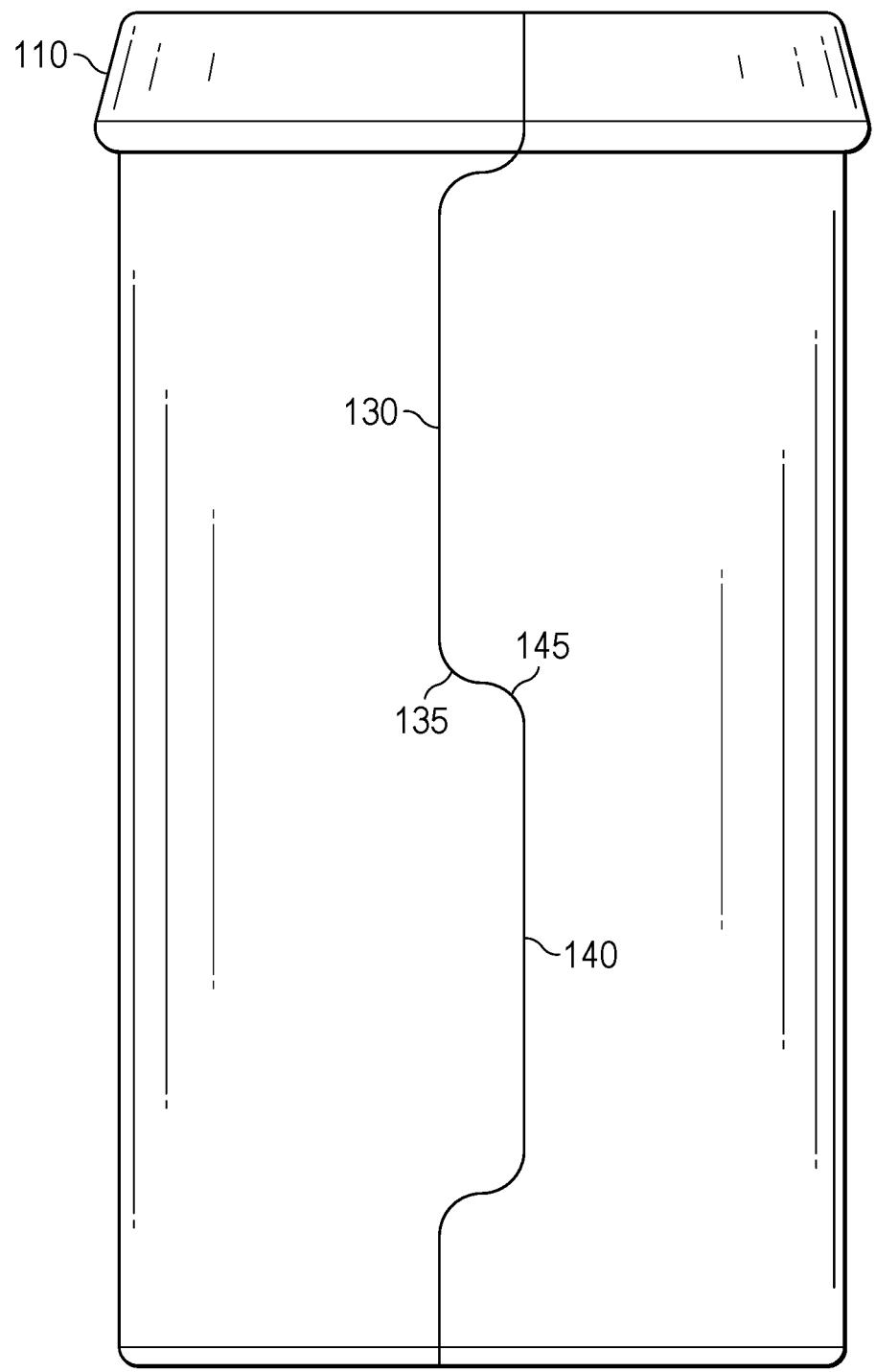
Figure 1E:
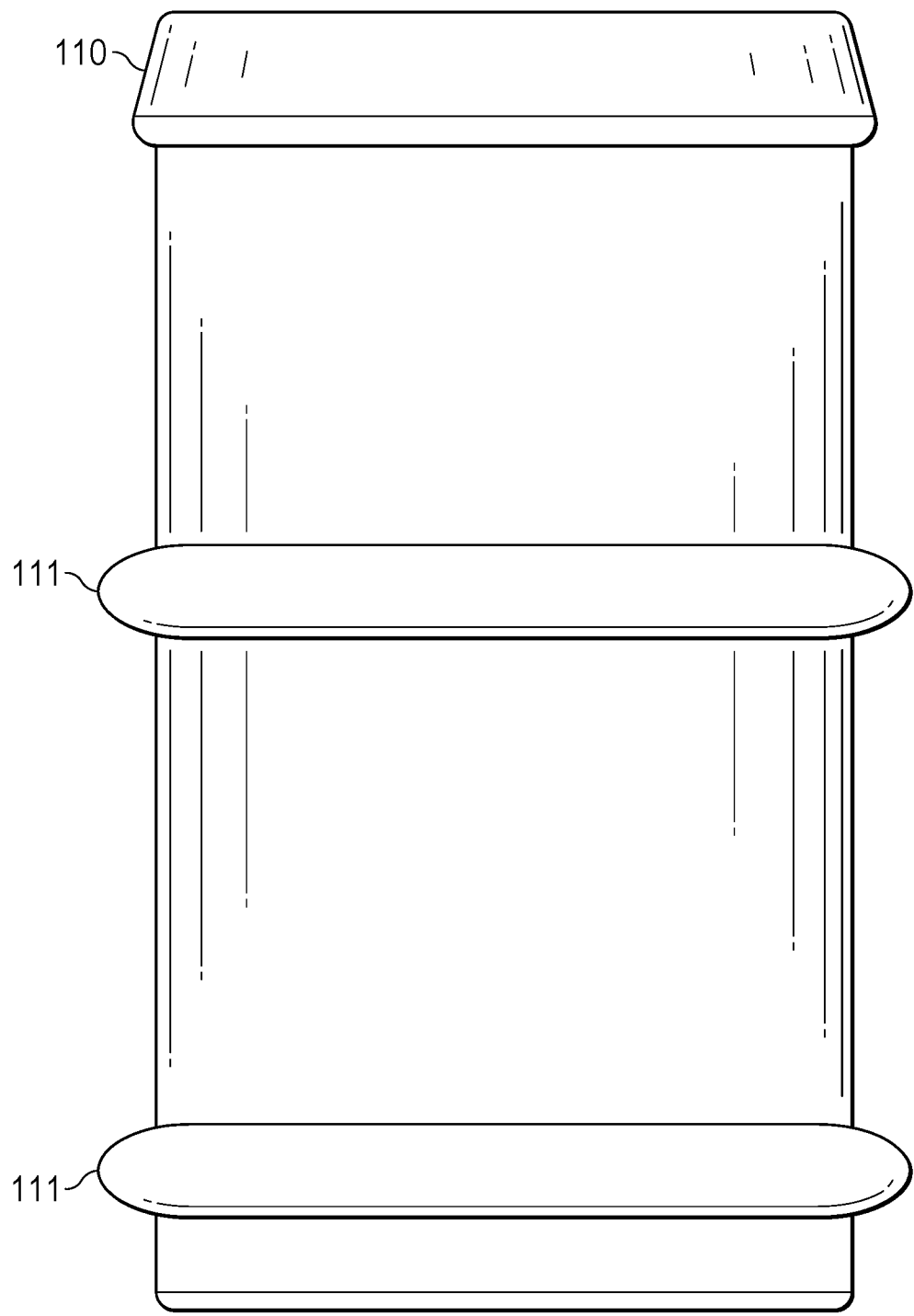
Figure 1F:
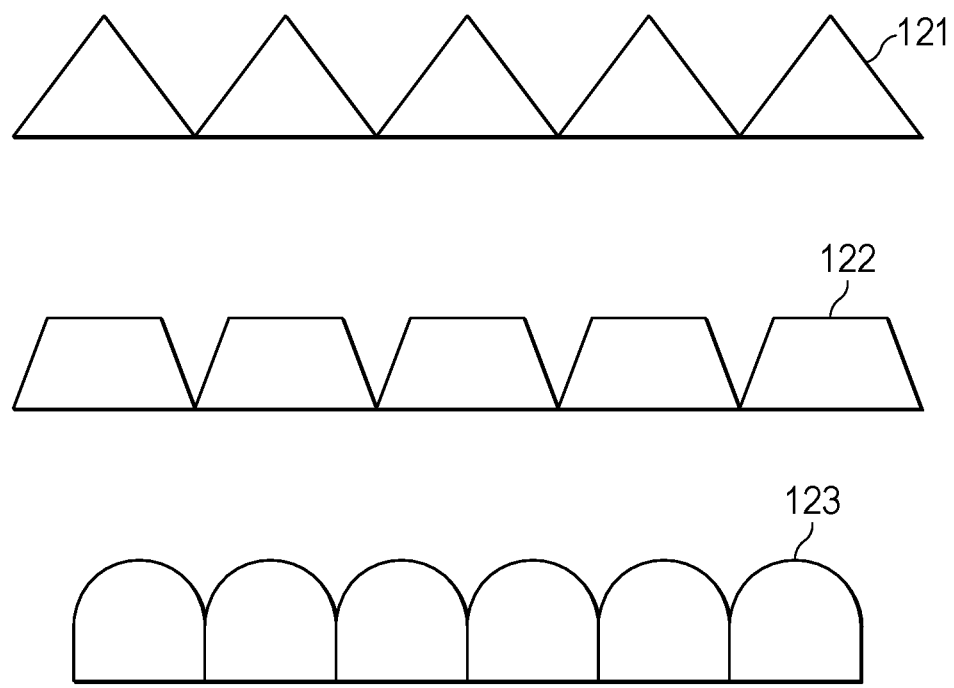

FIGS. 1A-1F show various views of a split ring wire bundle seal sleeve 100. Embodiments include sleeve retaining ridge 110. Embodiments include multiple options and numbers of sleeve retaining ridges. Referring to FIG. 1E, embodiments can include retaining ridges 111 in addition to sleeve retaining ridge 110. Embodiments include sealant gripping ridges 120. Embodiments include multiple options and number of shapes for sealant gripping ridges. Referring to FIG. 1F, the sealant gripping ridges can include triangular ridges 121. The sealant gripping ridges can include quadrilateral ridges 122. The sealant gripping ridges can include semi-cylindrical ridges 123.

This one piece embodiment is based on an elongated split ring including a first edge 130 comprising a first snap-fit latch mechanism 135. This embodiment includes a second edge 140 comprising a second snap-fit latch mechanism 145.

A two piece embodiment can be based on exact matching parts interlocking to create a cylinder. In particular, a latching mechanism to keep cylinder from decoupling. This can include a keyed interface between the sleeve halves maintaining consistent, longitudinal and circumferential coupling. Circumferential ridges on inner surface grip sealant putty and prevent wires from migrating while seal fitting is under pressure. The ridges are designed so that they do not damage the wires.

The external cylinder structure resists compression forces of assembled seal fittings. Outer surface of sleeve has ridges to mitigate sleeve migration when installed in flexible grommet. End of sleeve has a ridge to prevent longitudinal migration.

The hard plastic split ring described herein improves the quality of the aerospace industry standard fuselage pressure bulkhead wire bundle seal via removing human induced variability from the manufacturing process. Embodiments save time. Embodiments are portable and easily deployed to point of use when and where needed.

Figure 2A:
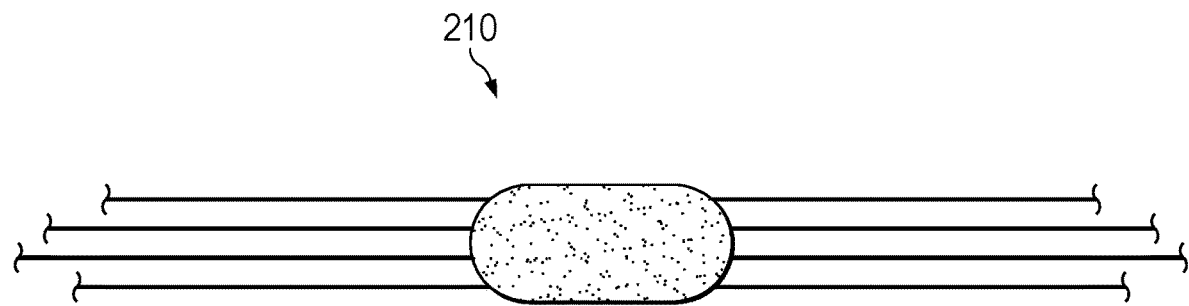
FIGS. 2A-2E are illustration of a series of steps for assembly of a split wire sleeve in structural context in accordance with an illustrative embodiment.
Figure 2B:
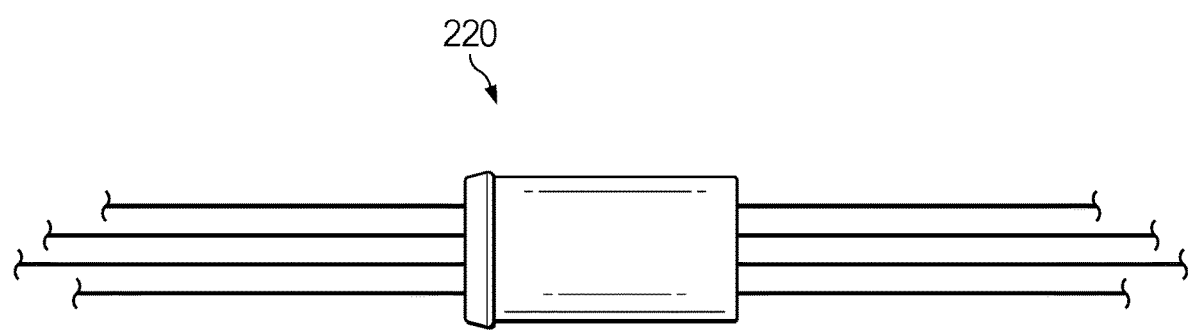
Figure 2C:
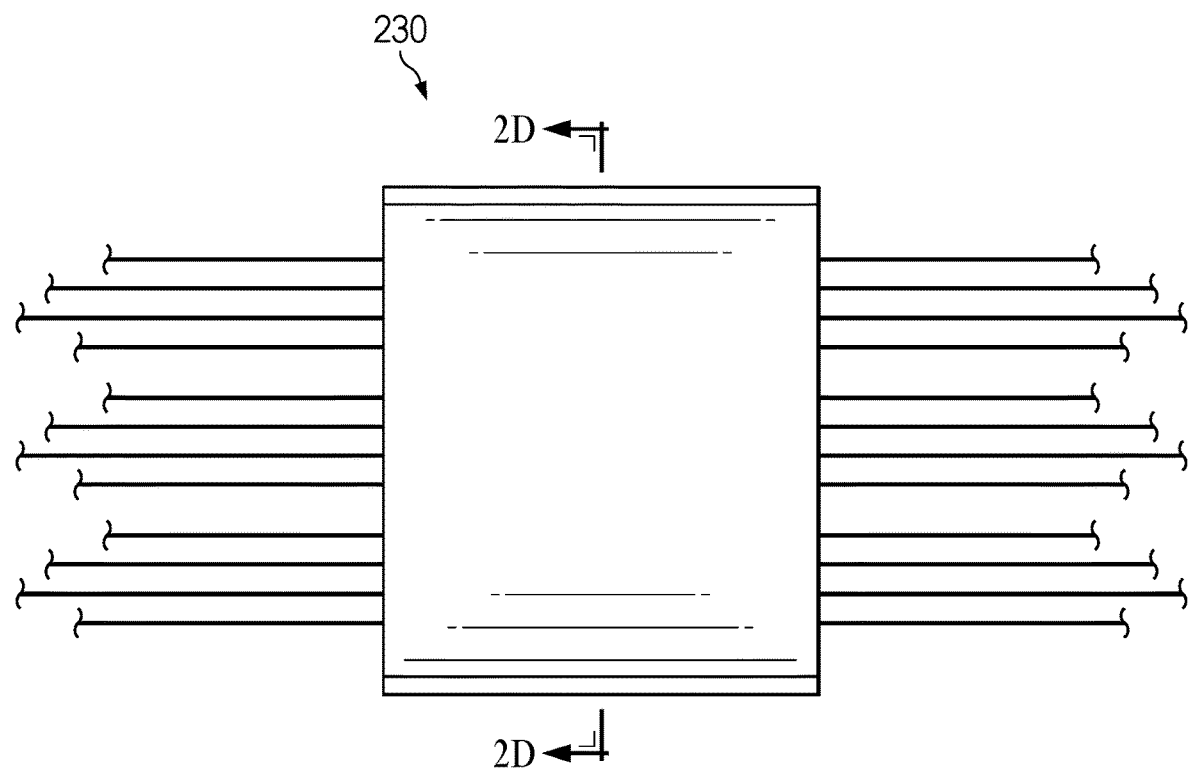
Figure 2D:
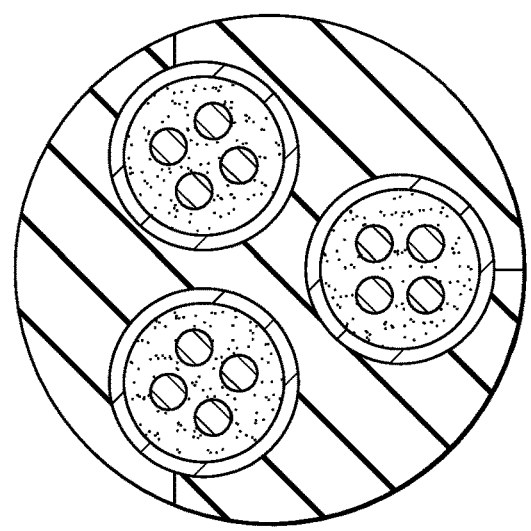
Figure 2E:
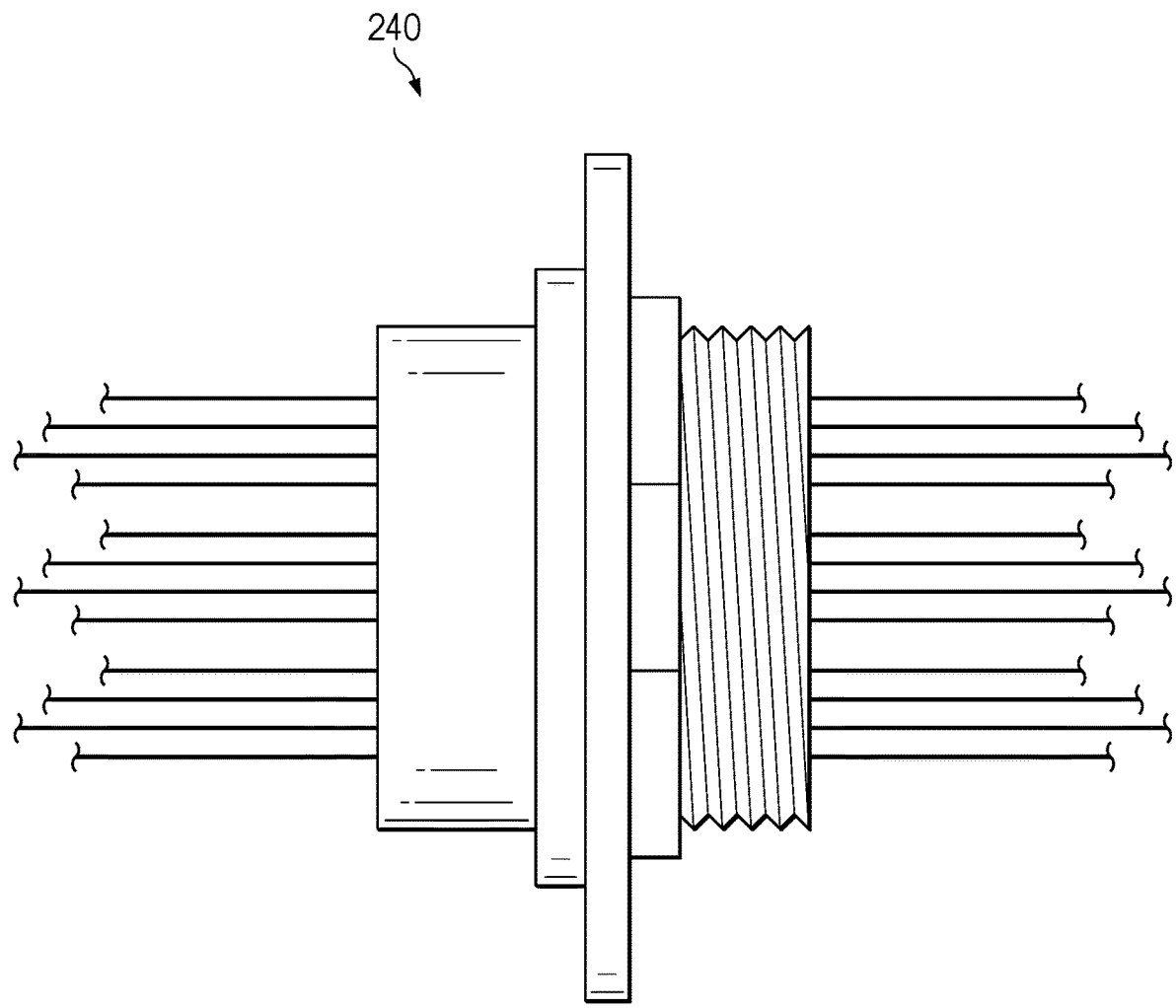

FIGS. 2A-2E show steps for a split wire sleeve assembly process for use in pressure bulkhead seal fitting applications. FIG. 2A shows a step 1 210. The goal of step 1 is to place sealant putty on the wires. FIG. 2B shows a step 2 220. The goal of step 2 is to assemble the split wire sleeve around the putty and wires. Compressing the putty until the two halves of the wire sleeve snap together is advisable. FIG. 2C shows a step 3 230. The goal of step 3 is to place assembled wire bundles inside the split compression seal grommet. The pressure grommets and the pressure seal fitting can be of multiple designs and still use the same wire sleeves. FIG. 2D shows cross section AA. FIG. 2E shows a step 4 240. The goal of step 4 is to assemble the split compression seal fitting around the grommet and then install the assembly on the pressure bolt feedthrough kit.

Embodiments can include two hard plastic rings with a controlled outer diameter. These rings can be pressed around wire bundles, squeezing out any extra partially cured sealant tape between the wires to create a sealed section of the wire bundle. The rings will ideally contain snap features to hold them in place. They also include features to ensure correct alignment. Finally, each ring can optionally be held together by flag marker tape placed at each end; so that the seals would not be broken if mishandled by final assembly.

Figure 3:
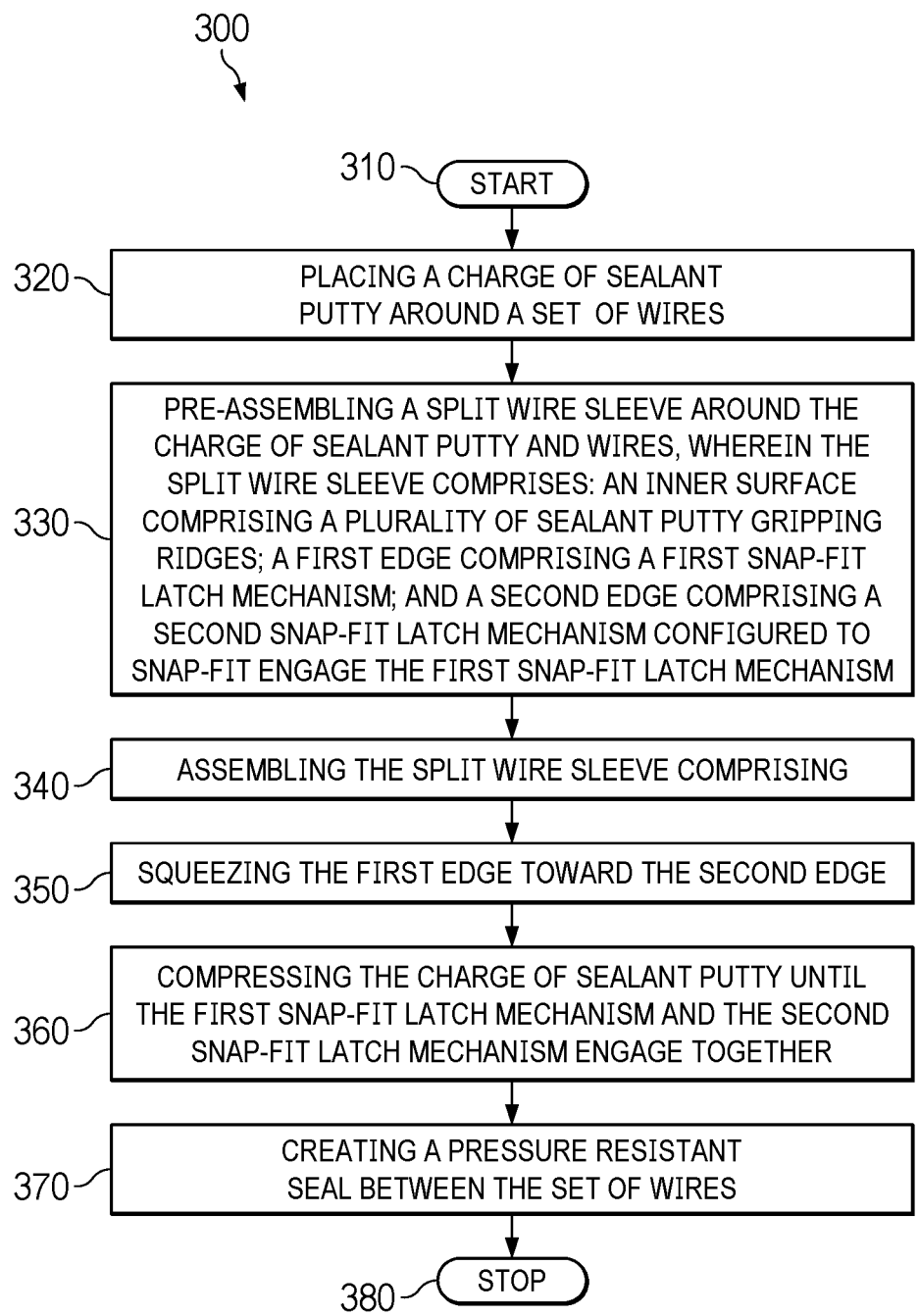
FIG. 3 is an illustration of a flowchart of a process of assembling a split wire sleeve for a pressure bulkhead wire feedthrough seal fitting in accordance with an illustrative embodiment.

FIG. 3 shows a flowchart of a process 300 for assembling a split wire sleeve for a pressure bulkhead wire feedthrough seal fitting. The process begins at start operation 310. At operation 320 the process includes placing a charge of sealant putty around a set of wires. At operation 330 the process includes pre-assembling a split wire sleeve around the charge of sealant putty and wires, wherein the split wire sleeve comprises: an inner surface comprising a plurality of sealant putty gripping ridges; an outer surface comprising a sleeve retaining ridge; a first edge comprising a first snap-fit latch mechanism; and a second edge comprising a second snap-fit latch mechanism configured to snap-fit engage the first snap-fit latch mechanism. At operation 340 the process includes assembling the split wire sleeve. At operation 350 the process includes squeezing the first edge toward the second edge. At operation 360 the process includes compressing the charge of sealant putty until the first snap-fit latch mechanism and the second snap-fit latch mechanism engage together. At operation 370 the process includes creating a pressure resistant seal between the set of wires. The process terminates at stop operation 380.

Figure 4:
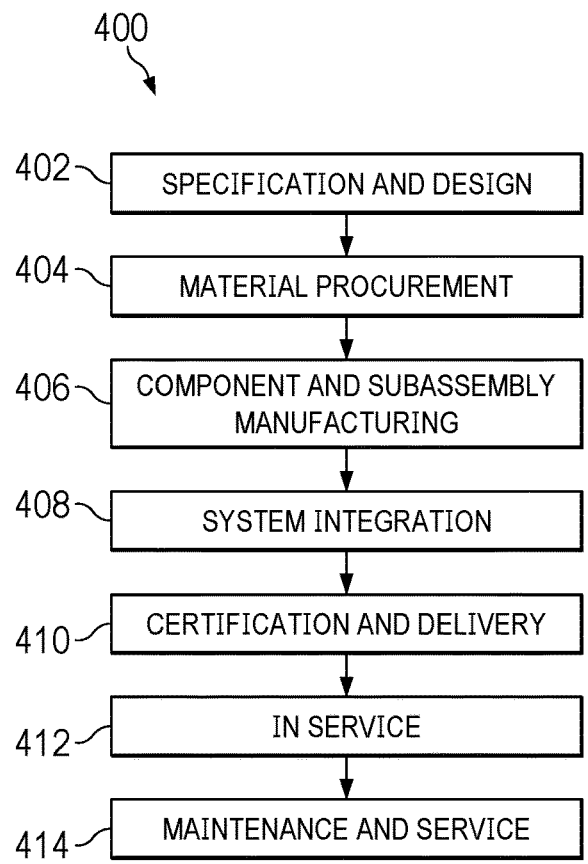
FIG. 4 is an illustration of an aircraft manufacturing and service method in accordance with an illustrative embodiment.
Figure 5:
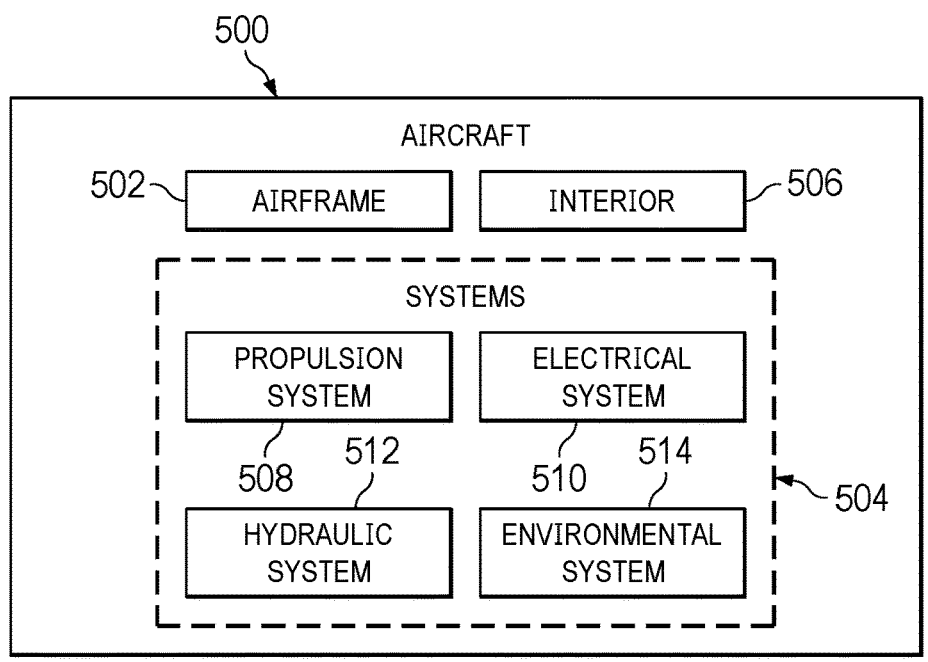
FIG. 5 is an illustration of a block diagram of an aircraft upon which an illustrative embodiment may be implemented.

Illustrative embodiments of the disclosure may be described in the context of aircraft manufacturing and service method 400 as shown in FIG. 4 and aircraft 500 as shown in FIG. 5. Turning first to FIG. 4, an illustration of an aircraft manufacturing and service method is depicted in accordance with an illustrative embodiment. During pre-production, aircraft manufacturing and service method 400 may include specification and design 402 of aircraft 500 in FIG. 5 and material procurement 404.

During production, component and subassembly manufacturing 406 and system integration 408 of aircraft 500 in FIG. 5 takes place. Thereafter, aircraft 500 in FIG. 5 can go through certification and delivery 410 in order to be placed in service 412. While in service 412 by a customer, aircraft 500 in FIG. 5 is scheduled for routine maintenance and service 414, which may include modification, reconfiguration, refurbishment, and other maintenance or service.

Each of the processes of aircraft manufacturing and service method 400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 5, an illustration of an aircraft is depicted in which an illustrative embodiment may be implemented. In this example, aircraft 500 is produced by aircraft manufacturing and service method 400 in FIG. 4 and may include airframe 502 with plurality of systems 504 and interior 506. Examples of systems 504 include one or more of propulsion system 508, electrical system 510, hydraulic system 512, and environmental system 514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 400 in FIG. 4.

In one illustrative example, components or subassemblies produced in component and subassembly manufacturing 406 in FIG. 4 can be fabricated or manufactured in a manner similar to components or subassemblies produced while aircraft 500 is in service 412 in FIG. 4. As yet another example, one or more apparatus embodiments, method embodiments, or a combination thereof can be utilized during production stages, such as component and subassembly manufacturing 406 and system integration 408 in FIG. 4. One or more apparatus embodiments, method embodiments, or a combination thereof may be utilized while aircraft 500 is in service 412, during maintenance and service 414 in FIG. 4, or both. The use of a number of the different illustrative embodiments may substantially expedite the assembly of aircraft 500, reduce the cost of aircraft 500, or both expedite the assembly of aircraft 500 and reduce the cost of aircraft 500.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A split wire sleeve for a pressure bulkhead wire feedthrough seal fitting, comprising:
   a split sleeve having a first end and a second end, the split sleeve comprising:
   an inner surface comprising a plurality of sealant putty gripping ridges;
   an outer surface comprising a sleeve retaining ridge that begins at the first end, that increases in height moving away from the first end, and that extends around all of a circular perimeter of the first end;
   a first edge that extends from the first end to the second end, the first edge comprising a first snap-fit latch mechanism that extends along all of the first edge; and
   a second edge that extends from the first end to the second end, the second edge comprising a second snap-fit latch mechanism that extends along all of the second edge and is configured to snap-fit engage the first snap-fit latch mechanism.

2. The split wire sleeve of claim 1, wherein the first snap-fit latch mechanism and the second snap-fit latch mechanism together cooperatively form a keyed interface to maintain consistent, longitudinal, and circumferential coupling when snap-fit engaged.

3. The split wire sleeve of claim 2, wherein the plurality of sealant putty gripping ridges comprise triangular cross-section shaped sealant putty gripping ridges.

4. The split wire sleeve of claim 2, wherein the plurality of sealant putty gripping ridges comprise quadrilateral cross-section shaped sealant putty gripping ridges.

5. The split wire sleeve of claim 2, wherein the plurality of sealant putty gripping ridges comprise hemi-cylindrical cross-section shaped sealant putty gripping ridges.

6. The split wire sleeve of claim 2, wherein the plurality of sealant putty gripping ridges comprise a plurality of different cross-section shaped sealant putty gripping ridges.

7. The split wire sleeve of claim 6, wherein the plurality of different cross-section shaped sealant putty gripping ridges are arranged in repeating pattern sets.

8. The split wire sleeve of claim 7, wherein the plurality of different cross-section shaped sealant putty gripping ridges are arranged in repeating pattern sets defining a repeating pattern pitch interval selected from the group consisting of 3, 4, 5, 6 or 7.

9. The split wire sleeve of claim 1, wherein the outer surface further comprises a plurality of sleeve retaining ridges to mitigate sleeve migration when installed in a split compression seal grommet.

10. The split wire sleeve of claim 1, further comprising a set of wires mechanically coupled to and passing through both the split wire sleeve and the sealant putty gripping ridges.

11. The split wire sleeve of claim 1, further comprising a split compression seal grommet mechanically coupled to the split wire sleeve.

12. The split wire sleeve of claim 11, further comprising a pressure seal fitting mechanically coupled to the split compression seal grommet.

13. The split wire sleeve of claim 12, further comprising a pressure bolt feedthrough kit mechanically coupled to the pressure seal fitting.

14. The split wire sleeve of claim 13, further comprising a pressure bulkhead mechanically coupled to the pressure bolt feedthrough kit.

15. A method of assembling a split wire sleeve for a pressure bulkhead wire feedthrough seal fitting, comprising:
   placing a charge of sealant putty around a set of wires;
   pre-assembling a split wire sleeve around the charge of sealant putty and wires, wherein the split wire sleeve comprises:
      a first end and a second end;
      an inner surface comprising a plurality of sealant putty gripping ridges;
      an outer surface comprising a sleeve retaining ridge that begins at the first end, that increases in height moving away from the first end, and that extends around all of a circular perimeter of the first end;
      a first edge that extends from the first end to the second end, the first edge comprising a first snap-fit latch mechanism that extends along all of the first edge; and
      a second edge that extends from the first end to the second end, the second edge comprising a second snap-fit latch mechanism that extends along all of the second edge and is configured to snap-fit engage the first snap-fit latch mechanism; and
   assembling the split wire sleeve comprising squeezing the first edge toward the second edge, compressing the charge of sealant putty until the first snap-fit latch mechanism and the second snap-fit latch mechanism engage together, and creating a pressure resistant seal between the set of wires.

16. The method of claim 15, further comprising placing the split wire sleeve, the compressed charge of sealant putty and at least a segment of the set of wires within at least one conduit of a split compression seal grommet.

17. The method of claim 16, further comprising assembling a pressure seal fitting around the split compression seal grommet.

18. The method of claim 17, further comprising installing the assembled pressure seal fitting on a pressure bulkhead.

19. A kit of parts for assembling a pressure bulkhead wire feedthrough seal fitting, comprising:
   a split sleeve comprising a non-hygroscopic, glass fiber reinforced plastic, the split sleeve having a first end and a second end and comprising:
      an inner surface comprising a plurality of sealant putty gripping ridges;
      an outer surface comprising a sleeve retaining ridge that begins at the first end, that increases in height moving away from the first end, and that extends around all of a circular perimeter of the first end;
      a first edge that extends from the first end to the second end, the first edge comprising a first snap-fit latch mechanism that extends along all of the first edge; and
      a second edge that extends from the first end to the second end, the second edge comprising a second snap-fit latch mechanism that extends along all of the second edge and is configured to snap-fit engage the first snap-fit latch mechanism;
   a source of sealant putty; and
   a split compression seal grommet.

20. The kit of parts of claim 19, further comprising a pressure seal fitting.

* * * * *